W. AUSTIN.
SAFETY AUTOMATIC TRAIN STOPPING MEANS.
APPLICATION FILED MAR. 10, 1914.
1,144,454.
Patented June 29, 1915.
5 SHEETS—SHEET 1.
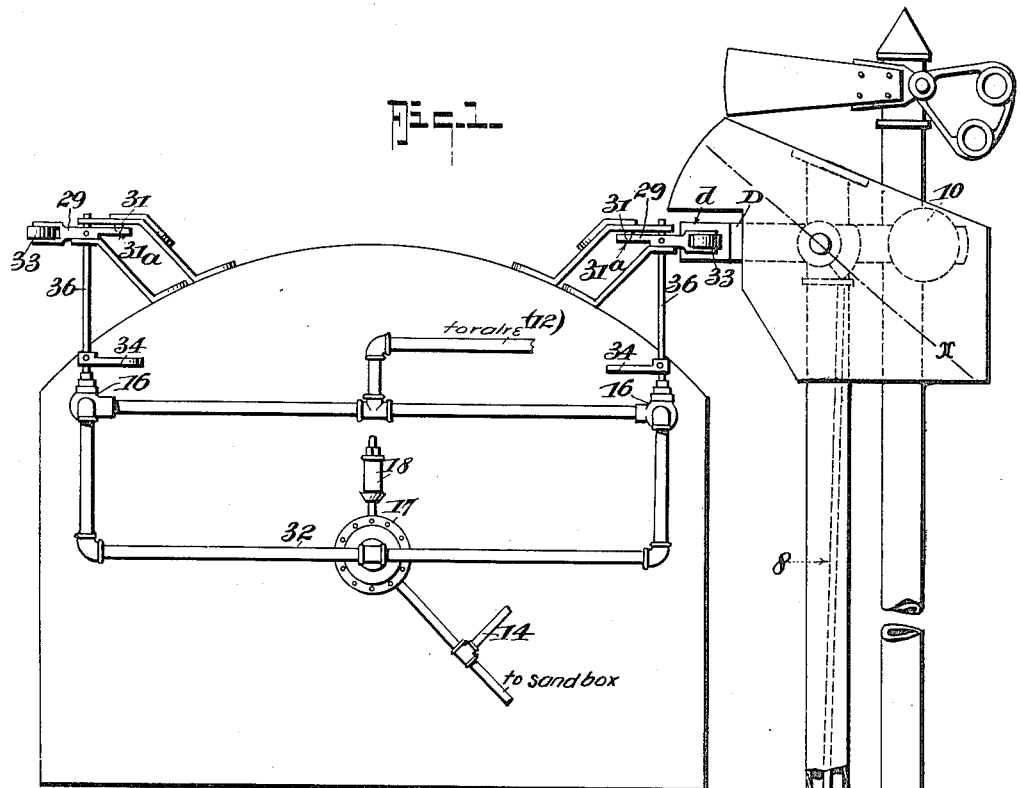
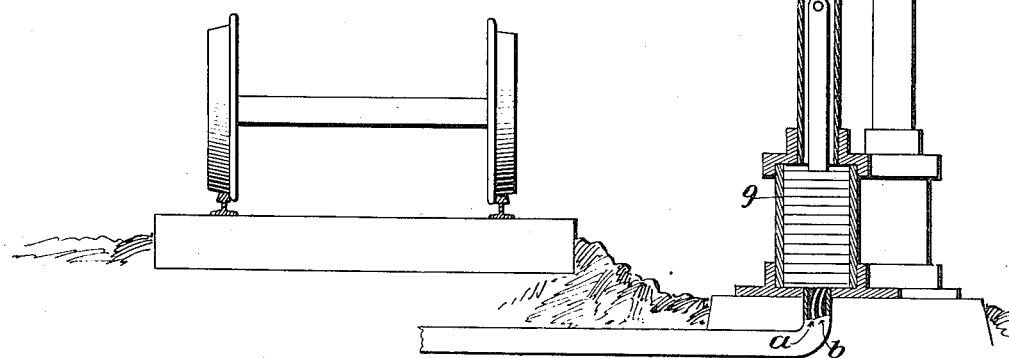
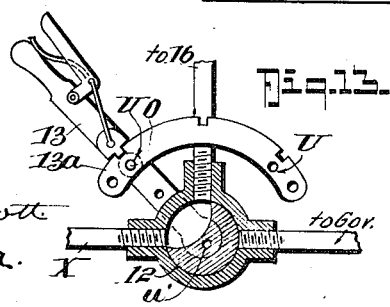
WITNESSES:
John T. Schrott
Charles Diller
INVENTOR
William Austin
BY
Fred G. Dieterich
ATTORNEYS

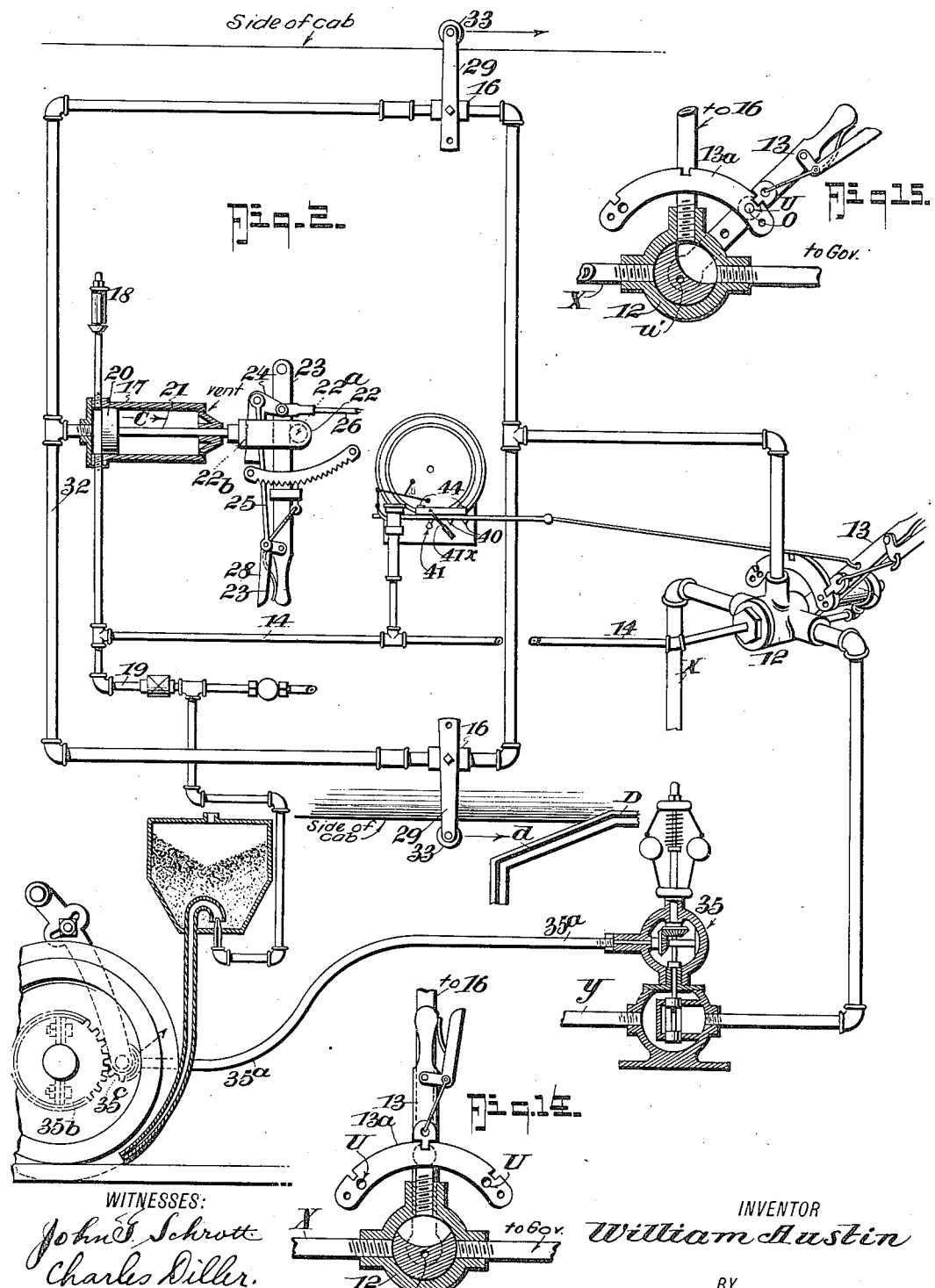

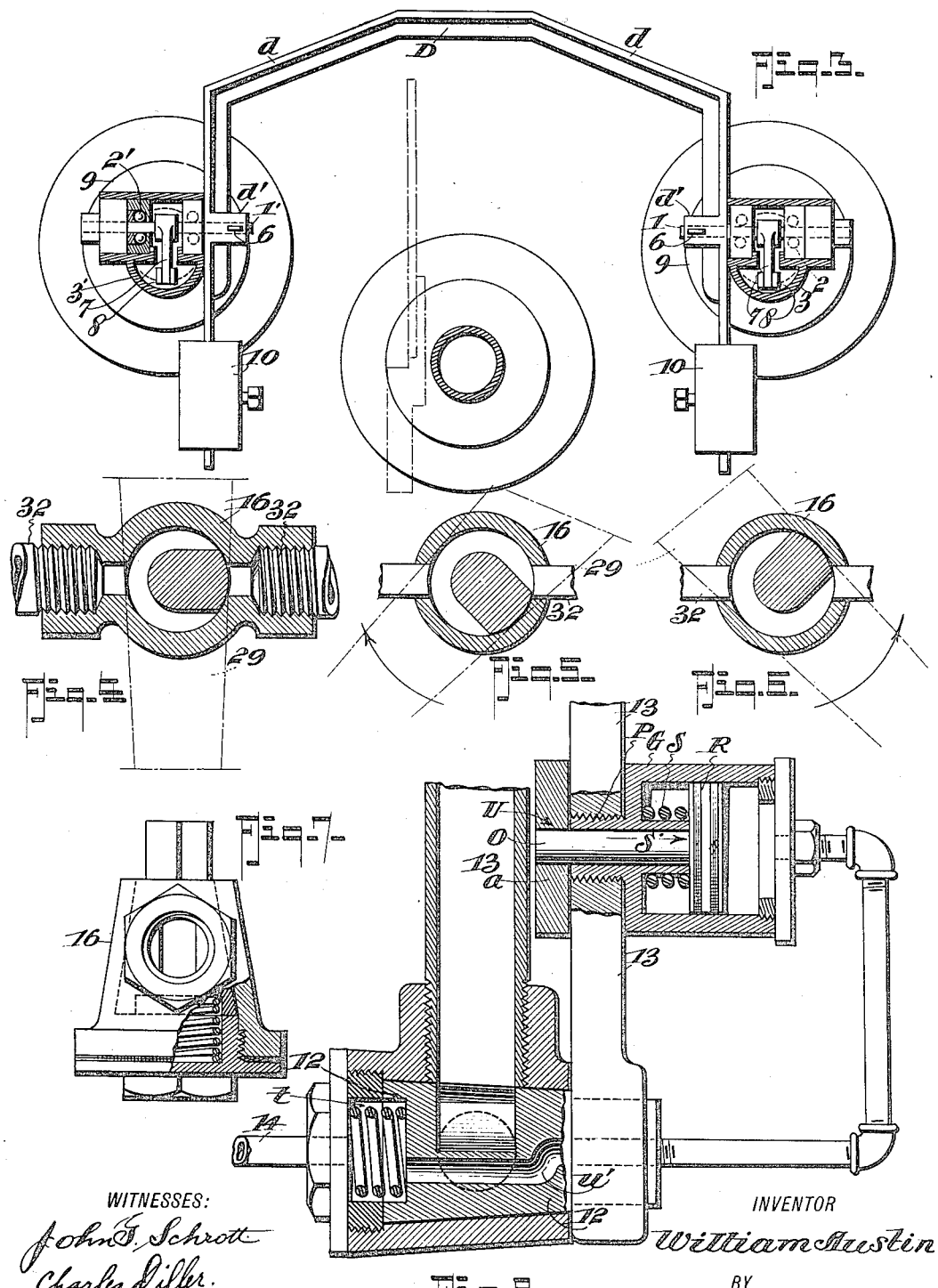

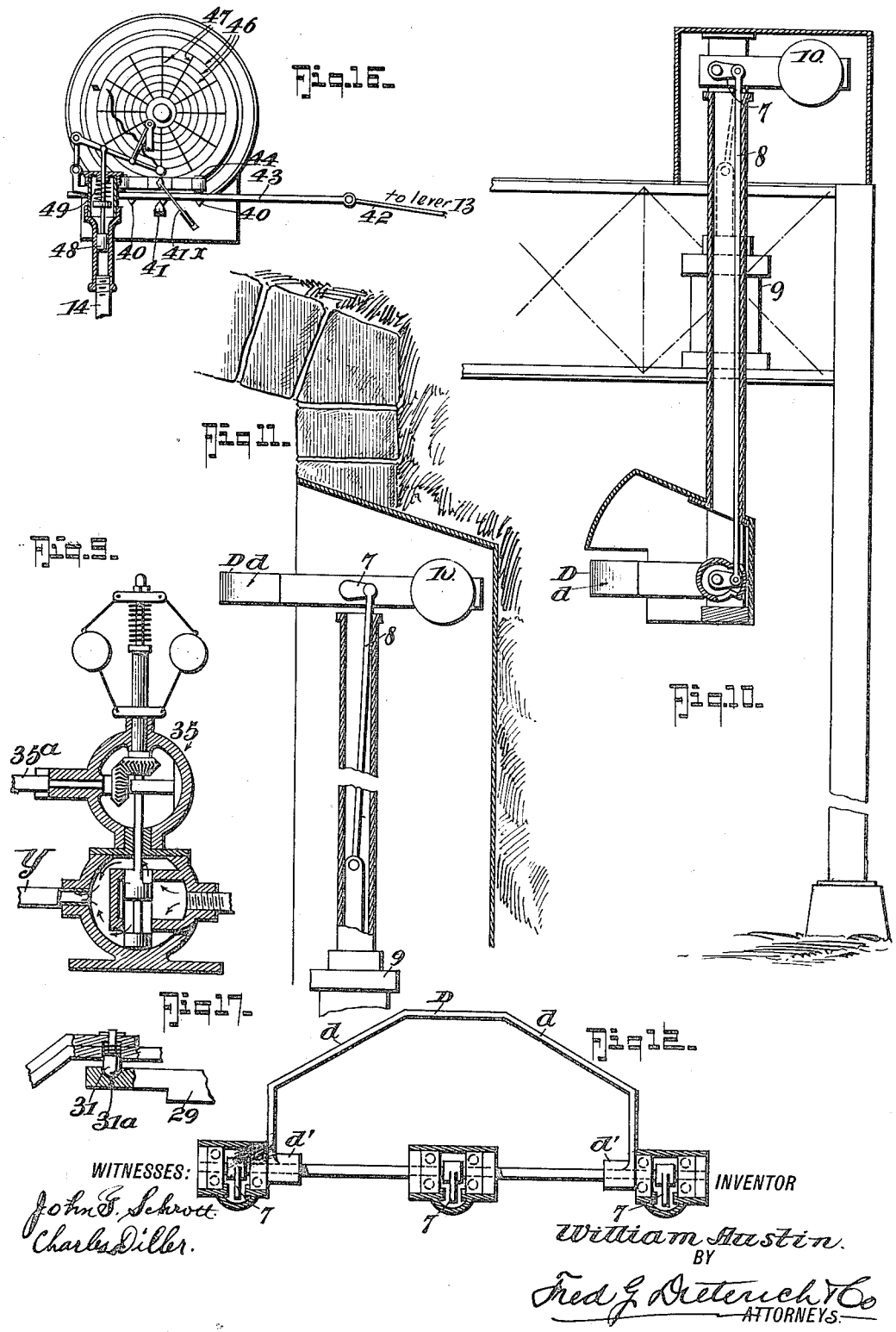

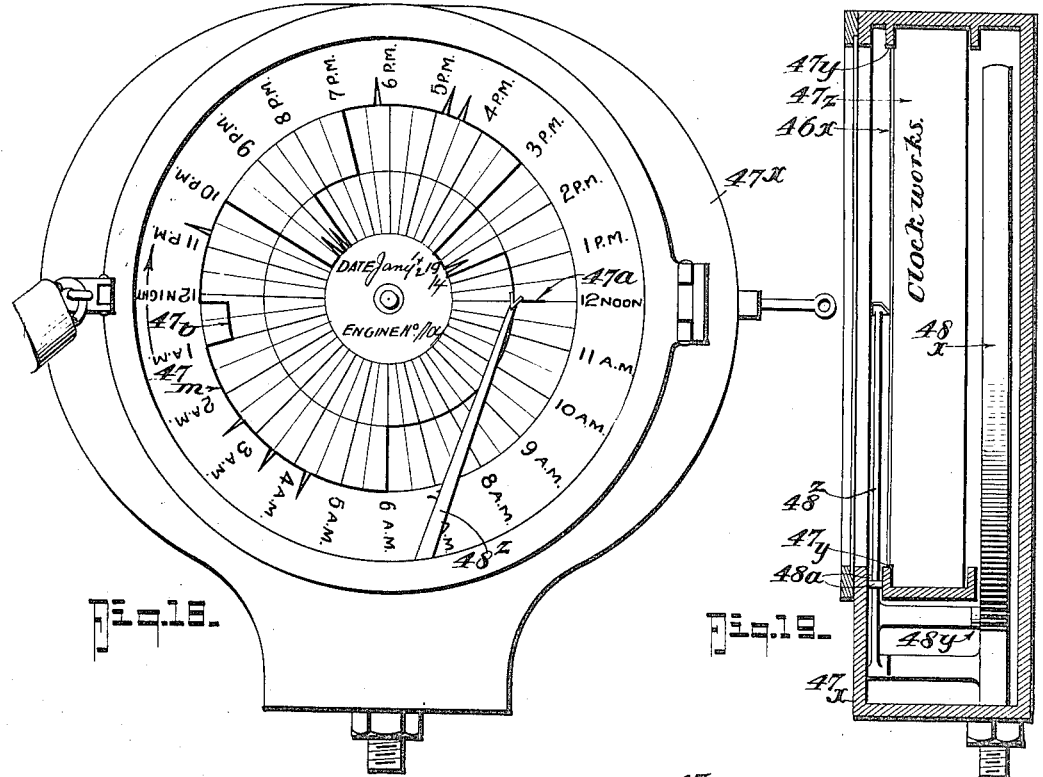
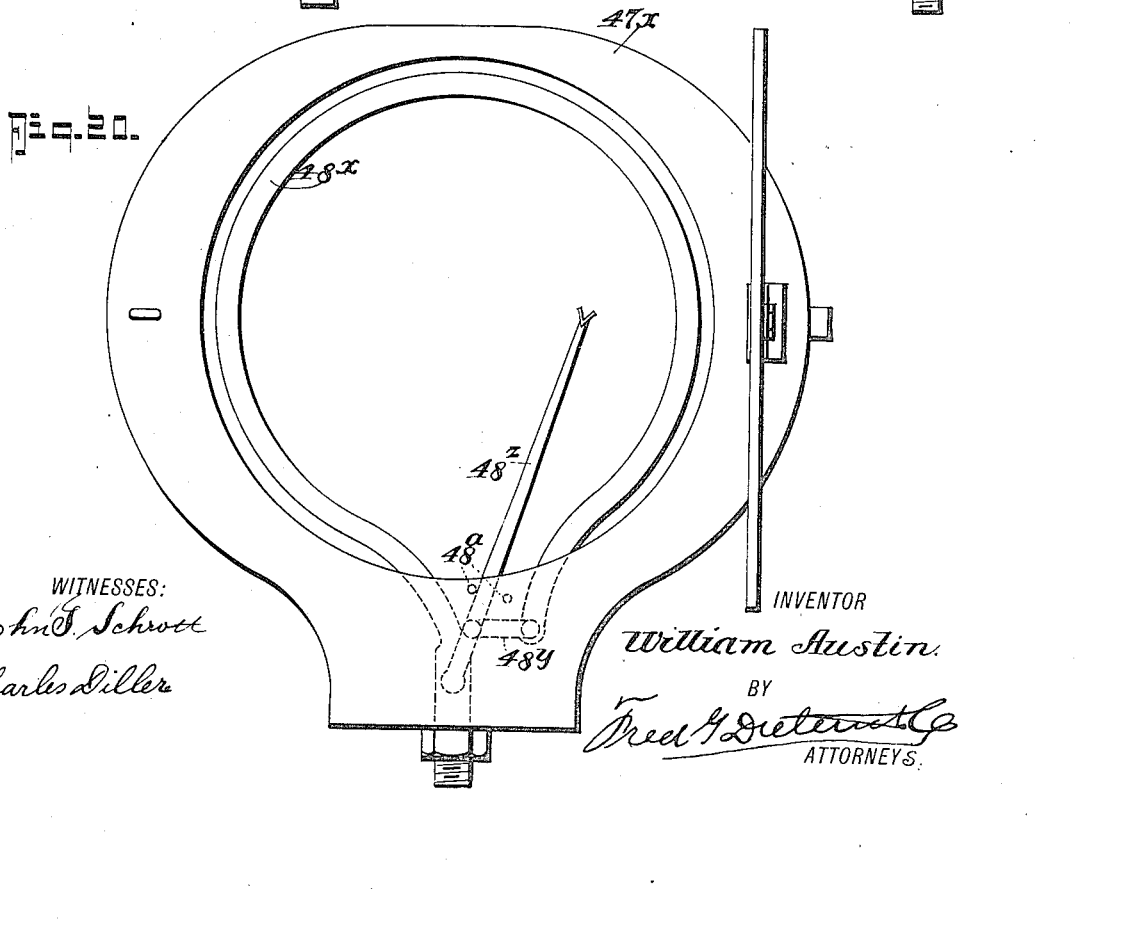

UNITED STATES PATENT OFFICE.

WILLIAM AUSTIN, OF SCRANTON, PENNSYLVANIA, ASSIGNOR OF ONE-HALF TO MICHAEL W. O'BOYLE, OF PITTSTON, PENNSYLVANIA.

SAFETY AUTOMATIC TRAIN-STOPPING MEANS.

1,144,454. Specification of Letters Patent. Patented June 29, 1915.

Application filed March 10, 1914. Serial No. 823,714.

*To all whom it may concern:*

Be it known that I, WILLIAM AUSTIN, residing at Scranton, in the county of Lackawanna and State of Pennsylvania, have invented a new and Improved Safety Automatic Train-Stopping Means, of which the following is a specification.

My invention primarily has for its object to provide a simple and reliable train stopping means of such arrangement that it constitutes an accessory to the ordinary air brake and block signaling systems, and which is especially designed for operating to automatically and safely arrest and stop trains disregarding the stop signal at a block, and thereby minimize the element of personal responsibility or error and prevent destruction of life and property caused by trains running past a fixed signal that indicates stop, and entering a block that is already occupied by a preceding train.

Another and important object of my invention, is the providing of an automatic train stopping system adapted for coöperation with the ordinary forms of air brake and block signal systems, under any conditions of weather in which it would be possible to operate trains and one that may be used in the open roadway, on bridges or overhead structures, or in tunnels or subways, without interfering with the recognized standards of clearance of rolling equipment, and in which the controlling elements located upon the locomotive vehicle from which my system is actuated, are so constructed, located and arranged, relatively to the roadway devices, as to conform with the recognized standards of clearance, and which cannot be damaged or in any manner rendered inoperative by structures, such as are permitted to exist on the roadway, or injured by oscillation or shock at high speed.

Another purpose of my invention is to provide an automatic train stop system capable of being used with either absolute permissive operation, or with speed control, when desired, that will cause reduction of speed to a predetermined degree before a stop signal can be passed; it being also so constructed that it cannot be tampered with, or rendered inoperative by the person in charge thereof.

With other objects in view which will hereinafter appear, my invention comprehends, when it is to be used in absolute operation, an improved mechanism which, rate of speed the brakes are automatically and simultaneously applies the car brakes, closes the throttle valve, sands the rails, sounds an alarm within the engine cab and makes a record of the aforesaid actions, the setting of the brakes being such that they cannot be released until the train comes to a full stop.

My invention also embodies, in its make-up an improved coöperative arrangement of parts adapted, when my improved system is used in speed control operation and when the train passes a stop signal, to cause no action on the brake applying devices when the speed of the train has been reduced to the predetermined rate required, it being understood that when running at a greater rate of speed the brakes are automatically applied in the same manner as happens when my system is used in absolute operation, except that the brakes can be released as soon as speed is reduced to the predetermined rate.

Again, my improved train stopping system includes an improved construction and coöperative arrangement of parts, by which, when my system is used under a "permissive operation" a stop signal may be passed without any action on the brakes, such use of my system also allowing for two or more engines to be used in a train without causing the brakes to be set by the second engine after the first engine has passed a signal that denoted proceed but changed to stop position as soon as the first engine passed it.

In its more complete make-up my improved train stopping system includes mechanism especially designed for recording or registering the number of times in any one trip that the stopping system has operated; the time of day the operation or operations took place, the length of time consumed in releasing the brakes, the reduction in the train line pressure, and also whether the system was used in absolute, permissive or speed control operation, and to furnish a complete record of every function for which my system is adapted to serve.

Having thus generally outlined the objects of my invention and the function the mechanical elements are intended to perform, my said invention, in its more subordinate nature, consists in the peculiar and novel features of construction, and the combination of the parts hereinafter fully explained, specifically pointed out in the appended claims, and illustrated in the accompanying drawings, in which:

Figure 1 is a diagrammatic view that indicates, in end elevation, the engine cab and the several parts of the mechanism, included in my system and located outside of the cab, and including the trip cock valves and their shifting levers, an elevated lever tripping incline, of a form such as is used in open roadways, where not more than two tracks are used, being shown in operative position to better illustrate the coöperative connections between the roadway elements and those mounted upon and carried with the engine cab. Fig. 2 is a diagrammatic plan view, parts being in horizontal section, that illustrates all of the operative elements of my system installed upon the locomotive. Fig. 3 is a plan view, partly in section, of one of the elevated trip inclines located on the roadway and with which the tripper devices, hereinafter referred to, coact. Figs 4, 5 and 6 are horizontal sections of the trip cock valve showing the same in the normally closed, open forward position, and open backward position, respectively. Fig. 7 is an end elevation of the said valve. Fig. 8 is a horizontal section of the "permissive" valve with interlocking cylinder, hereafter specifically referred to. Fig. 9 is a vertical section of the governor mechanism that forms a part of my complete system. Fig. 10 illustrates, diagrammatically and in elevation and section the form of the elevated trip incline mechanism used on the open railway where there are more than two tracks. Fig. 11 illustrates diagrammatically in elevation and section the form of elevated trip incline means used in a double or single track subway or such other places where existing structures do not permit any over-head structure without conflict with the recognized standards of clearance. Fig. 12 is a detail plan view of a slightly modified arrangement of the elevated trip incline shown in Fig. 11. Figs. 13, 14 and 15 are detail sectional views of the permissive valve hereinafter specifically referred to and showing the same in the "absolute operative control", "absolute permissive at any speed" and "permissive at slow speed only" position respectively. Fig. 16 is a diagrammatic front elevation of the recording and registering mechanism hereinafter referred to. Fig. 17 is a detail view of the trip lever latch devices. Fig. 18 is a front elevation of another form of gage which may be employed in my system. Fig. 19 is a cross section of the same. Fig. 20 is a front elevation of the gage with the clockworks mechanism and dial removed.

To render the operative relations between the roadway elements of my system and those mounted upon the engine cab or other passing vehicle, I shall first outline the detailed construction of the said road elements and the operative adjustments thereof. The said roadway elements comprise generally, what I term, the elevated trip incline, and in every instance, no matter if the supporting portions or standards are arranged as shown on Figs. 1, 10, or 11, they comprise a like coöperative arrangement of parts that I shall now describe in detail. The said elevated trip mechanism, which is best shown in Fig. 3, comprises a yoke D of steel, T-shaped in cross section, bent to form opposite side inclines $d$—$d$, with which the tripper devices, presently referred to, engage. The yoke D is mounted to oscillate on the stub shafts 1—1' journaled on ball bearings 2—2', suitably mounted in the cap members or housings 3—3', attached to the standards or columns, shown in Figs. 1, 10 or 11, as conditions may require, it being understood that in the practical application of my system the said columns or standards are located at the block terminals. The side arms of the inclines or yokes D have counterweights 10, which may be connected directly on the said arms, or on a separate lever, when arranged as shown in Fig. 10. Each stub shaft or axis for the yoke D is provided with a crank arm 7—7, and in all cases, except installations on an overhead bridge, the said cranks 7—7 are rigidly fastened to the shafts 1—1', which are secured to the hub members $d'$ of the yokes D, by keys 6, as shown in the drawings.

80 designates a plunger of a solenoid 9, that is suitably located with respect to the column or standard, and 8 designates rods that connect the said solenoid plungers with the cranks 7—7.

$a$—$b$ designate the wire leads from the solenoids, which, in practice, extend to the block signal circuit that acts on the red or "stop" signal only, as will be readily understood.

The yokes or inclines D, when set up for practical use, are located at a minimum height above the eaves of the highest cars used in interchange, and they are so installed, that when at their normal or horizontal position, they project nearly to the eaves line of the widest car (see Fig. 1), and at least ten inches above the height of the eaves of the said car. Since the horizontal position, is the lowest the yoke incline can assume, it is adapted, when the crank 7 is pulled down under solenoid action, to ascend and assume an angle of forty-five degrees to the horizontal position, as indicated by the broken line $x$, on Fig. 1, it being understood that it is at the angle position when the block is clear, as will be fully explained later on. It should be here stated, that in operation the incline yoke D is actuated in its movements to the horizontal position by gravity, and to its elevated position by the action of the energizing of the solenoid in exactly the same manner as the block itself operates, and since the solenoids, in practice, are in the same circuit with the block circuit, it follows that when the latter circuit is energized the incline yoke will move simultaneously with the block or stop signal and assume the horizontal or the inclined position when the stop signals assume similar positions. Thus, whenever the electric circuit is broken by a train in the block, an open switch, or a wash-out of tracks, the pulling action on the solenoids 9 is destroyed, and the yoke, by reason of excess of weight of the incline end over the counterbalancing weights, will gravitate to the horizontal position, it being understood that the corresponding signal or semaphore arm then also assumes the horizontal or stop position. When, at the horizontal position, the incline or yoke D cannot be passed by the locomotive without coming into contact and coöperating with the apparatus in the engine cab, and thereby cause the train to be either suddenly stopped, or its speed reduced to a predetermined rate, depending upon the conditions under which it has been authorized to be run, and as will be hereinafter fully explained.

It should be understood that the inclines or yokes and their direct connections when installed in the open roadway and exposed to the elements, are provided with dust-proof bearings, housings, etc., as shown.

The apparatus on the locomotive that is brought to action when the tripper devices carried by the engine contact with the yoke devices D, is best shown in Figs. 1 and 2, which show the entire mechanism required for equipping the locomotive or vehicle, with the exception of the ratio gears of the governor and the yoke required to attach the said gears to the engine truck axle, the interlocking means for the "permissive" valve lever hereinafter referred to being shown in Fig. 2. The apparatus or mechanism mounted on the cab includes a system of pipe connections, all of which, excepting a small pipe 14 which joins with the recording and registering gage 15 hereinafter referred to, are of the same diameter as the train pipes and the said system of pipes is preferably installed on the locomotive, in or about the cab and foot board and arranged for being suitably connected with the train line pressure pipes at X and Y.

Referring now more particularly to Fig. 2 of the drawings, it will be noticed that the pipe section that connects with the train line pipe, at X, leads directly to the train stopping means, through a permissive valve 12, hereinafter further described, when the said valve is in the absolute operative position, see Fig. 13. When the valve 12 is set as stated, the train line pressure enters the pipe system up to the trip cock valves 16—16, and is closed off from the remaining portions of the pipe system, so long as the said valves 16 are in their normal or closed position, (see Fig. 4) at which position the trip levers 29, that coact with the said valves 16, are projected at right angles to the line of motion of the train, as is clearly indicated on Fig. 2 of the drawing, and when the parts mentioned are thus set no effect will be produced upon the brakes or other apparatus. The trip levers 29 are connected to the rods 36 that extend up from their respective valves 16 sufficiently above the cab to bring the trip levers 29 on a level with the center of the incline or contacting portion of the yoke D, when the latter is in the horizontal or stop position, see Fig. 1. For restoring the valves 16 to their normal position, each of the rods 36 has a handle 34 and to overcome possible displacement of the valves 16 by jars or jolts, the said levers 29 move between a pair of brackets and each has a concavity 31ª with which a spring pin 31 engages. For absorbing shocks when striking the incline yokes D when running at a rate of speed the levers 29 have hard rubber roller contacts 33. The parts being adjusted as described and assuming the lever 29, see Fig. 1, as about to come into contact with the roadway stop member or incline D, when this occurs the lever 29 will be forced back to an angular position, and thereby open up the train line air through the piping 32, to effect the cutting out of the engine by shifting the throttle valve, sanding the tracks, and at the same time, record and indicate the said operations. The train air passing into the piping 32 rushes into a cylinder 17, connected to the said piping 32, and against a piston 20, part of the said air and pressure simultaneously passing up through and sounding an alarm whistle 18 and part thereof passing into pipes 19, one of which pipes 19 leads to the sander and is used for blowing sand on the rails and the other, 14, leads air to the recording and indicating devices hereinafter further explained, the exhaust air escaping to atmosphere through pipe 19 via the sander.

It is apparent from the foregoing and the showing in Fig. 2, of the drawings, that when the train pressure is free to pass through either of the valves 16 the steam will, through the shifting of the throttle lever, be cut off, the brakes will be applied, the tracks sanded and a record made of the train stopping operation, and the said operations of the several parts that constitute my system are simultaneously effected, to thereby bring to rest a train in a shorter distance and space of time than would be possible by human effort, since no one person could possibly perform all of the above functions simultaneously. Furthermore, when the aforesaid action takes place, and when the permissive valve is at absolute operative position, (see Fig. 14) the brakes cannot be released until the pipe line is closed by restoring the valve 16 and the levers 29 to their normal positions. At this point, it should be stated, that in my complete automatic train stop mechanism means is also included for positively holding the permissive valve lever locked to its set positions, until all of the pressure in the train line has escaped, the purpose of which and the means provided for such purpose will be hereinafter fully explained.

For shifting the throttle lever, when the train pipe air passes through the valve 16 as before stated, I prefer to employ the devices shown in Fig. 2 and which include a piston rod 21 provided with jaw 22 that straddles the throttle lever 23 and a bell crank member 24, the said jaw 22 carrying a roller bearing 22ª at the outer end that engages one edge of the lever 23 and a shoulder bearing 22ᵇ that engages the crank member 24. When the air pressure forces the piston 20 and its rod out, see arrow C, the bell crank 24 is swung as indicated and since the said crank 24 is connected with the throttle stem 26, it pulls the said stem in a direction to close the throttle. A rod 25 is attached at one end to the angle of the bell crank lever; it has its opposite end attached to the pin in the hand latch 28, the connections being such that as the bell crank 24 is shifted, as stated, it releases the pawl from the toothed quadrant which operation occurs when the bell crank lever is forced toward the throttle lever 23.

Under normal conditions the cylinder 17 contains no air under pressure and since it has free vents on both ends as shown, the piston 20 is easily moved back and forth, as the throttle lever is moved back and forth under ordinary conditions and further since the piston 20 moves under a minimum resistance, the action of opening and closing the throttle by hand positively assures that it is always in perfect working order. When the throttle is opened wide, the lever 23 is in the position shown in Fig. 2.

It should be stated that in practice the opening through the valve 16 is greater than the combined openings to the whistle 18 and pipe 19, the reason for which is explained as follows: It is obvious that if air under pressure is admitted to the cylinder 17 through pipe 32, some of the said pressure is lost, when the air which passed out through the whistle 18 and the pipe 19—which creates sufficient reduction in the train pipe lines to cause the brakes to be applied, but since more pressure is applied against the piston 20 than can be led off through the parts 18 and 19 the air under pressure causes the said piston 20 to drive forwardly and actuate the throttle shifting devices before explained.

The air pipe 19 for the sanding device, in practice connects with the ordinary type of the sand air blower pipe just ahead of the operating valve on the said pipe, the connection being such that when air under pressure is admitted to the pipe 19 it serves to blow the sand on to the rails in the same manner as though the engineer had opened the sand blower valve in the regular pipe. The importance of this element of my complete system is apparent, since it materially aids in stopping the train in a much shorter distance than would be possible were the rails not sanded. Further, it also eliminates the danger of sliding or flattening the wheels when the emergency brake is applied—and serves, as it were, a double purpose and renders the entire system more efficient in its operation.

One of the essential features of my complete system, is its being practically adapted for use under what I term " absolute permissive " conditions, that is for being used only in case of special orders, cases of emergency, where it is necessary for one train to assist another, or in case of a pusher or double header where it is desired to have the stopping rendered inoperative, except on the leading engine.

It will be noticed, in Figs. 13–14 and 15 the permissive valve device includes a casing having three parts, one of which d, leads to the piping to valves 16, one e to the train line at X and the other f through a governor mechanism to the train pipe connection Y. The valve 12 is of a special three way plug type, which, when it is set to absolute operative position, brings the train pipe line from X into communication with the pipe system in which is located the valves 16. When the valve 12 is set as shown in Fig. 14, that is the absolute permissive system, the train pipe line is entirely cut out thus making the entire stop mechanism inoperative, it being understood that the cutting out of the stop mechanism is done only on the engines other than the leading engine, when the train has two or more engines. When the valve 12 is set as in Fig. 15, it renders my system operable under what I term " permissive under speed control," and when thus adjusted the function of the valve 12 is to bring the train stopping means in connection with the train air line from the end Y through a governor mechanism 35.

The object in providing for a permissive under speed control action of my system is that since the governor valve is adapted for operating only when the train is running at a greater speed than a predetermined rate, a stop signal may therefore be passed when running at a speed under a fixed or predetermined rate, but cannot be passed when running at a greater than the predetermined rate without applying the brakes and having the other functions performed in exactly the same manner as though being used in the absolute operative position, it being understood that when the train is running under the greater or excessive speed the governor valve opens and permits the train air to flow from Y through valve 12 and up to the valves 16 in the pipe system.

The speed control of the permissive valve 12 is especially designed to be used in cases of congested traffic and allows trains to keep moving so long as speed is reduced to a fixed rate when passing the stop signal.

It is apparent from the foregoing that the valve 12 performs a very important function in my automatic train stopping system, since a controlling means of this character is absolutely essential to render my complete system practical and reliable.

Since my system is designed for automatic action under any of the conditions which may be met, it is most essential that some means be included in the said system for furnishing indisputable evidence of every action that takes place in the handling of the brakes for the entire trip and particularly for automatically registering any change or shifting of the valve 12 made by person in charge of the locomotive and to that end in my system, I provide against shifting of the lever 13 for the valve 12 at improper times, what I term an "interlocking cylinder mechanism" actuated by the train air pressure and which serves to lock the lever to remain at its set positions until the entire train line pressure is exhausted.

Referring now more particularly to Fig. 8, 13 designates the lever that connects with the valve 12, and 13ª denotes a quadrant over which the lever 13 moves, and which has two apertures U to be engaged by a detent in the nature of a stem O that projects through a hub bearing P formed in one end of a cylinder G, the said bearing being threaded to fixedly connect with the lever 13. The stem O carries a piston R that is normally forced by a spring S in the direction of the arrow S', to release the said stem O from the quadrant. The air pipe 14 of the air pipe system leads the air into a pocket formed in the casing that has the valve 12. u designates a bore that leads the air through the casing and the valve 12 into a pipe connection which conveys the air into the cylinder G against the piston R. Lever 13 is also equipped with the usual thumb latch detent for engaging the notches in the quadrant for holding the lever when it is shifted by the operator and under ordinary conditions.

By reason of the peculiar construction of the means just described it is apparent that when my automatic train stop mechanism is in operative action the lever 13 remains locked and cannot be again shifted until the train pipe air pressure is exhausted—after which the spring S, back of the piston R pushes the piston and its detent to the lever released position to be again manually shifted to set the valve 12 to the desired position.

The governor mechanism before referred to is of the ordinary fly ball type, except that it operates opposite to the way the governors used on steam engines operate, that is to say, in my construction the governor valve remains closed, so long as the fly balls are revolved at a certain fixed rate of speed and when the said rate of speed is exceeded the valve opens, the extent of such opening varying with the differences in the said excess of speed. Thus, when my system is working under "permissive at slow speed control" only should a train attempt to pass the stop signal at a greater than the predetermined rate of speed, the brakes would be applied exactly the same as under the other adjustment of valve 12 and a record be made thereof but should, however, the speed of the train be reduced to or below the fixed or predetermined rate, the governor valve would remain closed and even though the trip valve 16 be now knocked open, it would have no effect on the system, since the governor valve being now closed prevents the train line pressure passing up to valve 12 and the pipe system. The governor mechanism includes a flexible shaft 35ª and two ratio gears 35ᵇ—35ᶜ, one of which is bolted to the truck axle and the other is mounted in a swinging yoke to mesh with the former gear and connected by a flexible shaft to the governor and adapted to operate when the engine is running either forward or backward.

From the foregoing, it will be noticed that the valve 12 is adapted for being set to three distinct positions, viz: absolute or operative, absolute permissive, permissive under speed control, and when utilized under absolute operative position, there is no way in which a train may pass by a stop signal without the brakes being applied, the train stopped and the controlling lever 12 held locked against manual adjustment until all train line pressure has been discharged. As before noted in my system every action in the operation thereof is recorded and indicated.

The recording and registering gage attachments, in my complete system are arranged to be set in operation under any train pressure that may flow through pipe 14, and to the extent hereinafter explained, operated by the shifting of the hand lever 13. In the construction shown in the accompanying drawings, I have illustrated two forms of gage mechanism. The form shown in Figs. 2 to 16 differs from the ordinary time pressure gage in the following manner, viz:—

The clock mechanism of the gage includes a striking device similar in construction to that of an ordinary clock, which strikes the hour and half hour except that the hammer 41$^x$ strikes only once, and only when the hammer pawl 41 has been released, which operation in my system is governed by the shifting of the controlling levers 13, through small cams 40—40 on a steel rod 43, which, through the link 42 connects with the said controlling or permissive valve lever 13. 44—44 designate two small spools mounted on the rod 43 and to these are attached the ends of a three colored ribbon tape, and in such a manner that the red portion of the said tape corresponds to the absolute operative position of the permissive valve 12, the green portion to the speed control position of the said valve 12 and the purple to the absolute permissive position of the valve 12. The striking hammer has a diamond shaped rubber inserted in its face that strikes the ribbon tape exactly under a recording pencil or pen 45 but outside of the concentric pressure line on the margin of the said dial. The several parts just described are relatively so arranged that whenever the lever 13 is shifted from one position to another, the striking pawl 41 is released which allows the hammer to strike and print a diamond shaped spot on the margin of the dial, the color of the said spot representing the position under which the train stopping device is being used, and since the dial is revolved by the clock mechanism, in the same manner as are the hands of a clock, it follows that the exact time of every change can be read as also the time between the said changes. The dial is laid out with concentric circles 46 that indicate zero train line pressure, and radial lines 47 that represent the time of day in five minute intervals. The pen or pencil 45 is actuated by a small piston 48 that is moved in one direction by train line air under pressure and moved in the opposite direction by a spring 49. The pen is arranged to rise and fall with every variation of the train line pressure, and as the dial is constantly revolving, the pen will describe a concentric line between the circle lines and radial lines whenever the pressure rises. By reason of the automatic shifting the control of the pen and the printing hammer devices as stated, the dial not only furnishes a complete record of all the variations in the pressure, at all times of the day, but also records every change in the position of the permissive valve lever 13 and also shows just what position the stopping means has been operated under, the length of time in each position and the number of times and hours of the day that the said stopping means has been applied to the brakes.

In the form of gage illustrated in Figs. 18, 19 and 20, the casing 47$^x$ is provided with guide ways 47$^y$ in which the clockworks mechanism 47$^z$ is bodily laterally shiftable, and carries the recording dial 46$^x$. The clockworks mechanism may be of any approved construction and, *per se*, forms no part of the present invention. The mechanism also includes an expanding tube 48$^x$, the free end of which is linked at 48$^y$ to the stylus carrying lever 48$^z$, the movement of which is limited by a pair of stop pins 48$^a$. The dial 46$^x$ is provided with three concentric zero graduation circles, corresponding to the three positions of the permissive valve, the central circle being the non-operative circle, that is to say,—the one on which the pen traces a continuous circle under zero air pressure. The inner circle corresponds to the speed control position of the permissive valve and the outer circle to the absolute operative control position of the same. The clockworks mechanism and dial are bodily shifted through the medium of the connecting rod 42 which joins with the lever 13. The dial is also graduated with radial time indicating lines as clearly shown in Fig. 18 of the drawing. In Fig. 18 of the drawings, the dial is shown with a record for twenty-four hours of a supposed operation and an analysis of such record shows the following:—The heavy line 47$^m$ indicates the path traced by the stylus during the period of twenty-four hours, commencing at 12 o'clock noon. The record shows that the dial was placed in the record at 12 o'clock noon, January 1, 1914, as indicated by the radial line 47$^a$, which is made in this position only when the pen is moved over by hand to indicate the starting position; 12 o'clock noon to 1.30 p. m. the apparatus was operated in the absolute permissive position of the lever 13; 1.30 p. m. to 3 p. m. the apparatus was operated in the speed control position of the lever and the brakes were applied at 1.45 only; 3 p. m. to 7 p. m. the parts operated in the absolute operative position of the lever 13 and the brakes were applied three times namely, at 4.30, 4.45 and 6.15 p. m.; from 7 p. m. to 8.30 p. m. the parts were operated in the absolute permissive position of the lever 13; 8.30 p. m. to 10 p. m. the parts were operated in the speed control position of the lever and the brakes were applied two times namely, at 8.45 and 9.15 p. m.; 10 p. m. to 12.10 a. m. the parts were operated in the absolute operative position of the lever 13 and the brakes were operated once only at 10.45 p. m.; from 12.10 a. m. to 1 a. m. the lever was in the mid-position between absolute operative and absolute permissive which shows that an effort was made on the part of the person in charge of the apparatus to avoid the record, this indication being at the place marked 47ᵇ in Fig. 18; from 1 a. m. to 6 a. m. the parts were used in the absolute operative position of the lever 13 and the brakes were applied three times namely, at 2.45, 3.30 and 4.20 a. m.; from 6 a. m. to 11.40 a. m. the apparatus was used in the operative permissive position of the lever 13. (This indicates the interval between the time the engine cut loose from the train and the dial was changed at the terminal, it being understood that the dial should be replaced when the parts are in such position and the mark 47ᵃ is always made at that place by hand to indicate the starting point.)

It is understood the dials are removably mounted. In my gage mechanism, when applying the new dial, the permissive valve lever is slightly moved away from position it is occupying and immediately returned to its former position so that the pawl will be released and the proper starting indication will be made on the dial. This recording and indicating feature of my complete automatic train stopping mechanism is important since it provides an indisputable record of every action and when setting the brakes and bringing the train to a stand by my stopping system.

It is understood that on all trains equipped with automatic air brakes, the brakes are applied by a reduction in the train line pressure regardless of the place where the said reduction is made.

From the foregoing description taken in connection with the accompanying drawings, the complete construction of my train stopping system, the manner in which it is adapted for operating under various conditions required and the advantages thereof will be readily understood by those skilled in the art to which my invention relates.

What I claim is:—

1. In a train stopping system, a gravity-drop controlled obstacle situated along the right of way and a train carried apparatus coöperative therewith; said train carried apparatus including the following elements in combination; to wit, a permissive valve, two connections between said permissive valve and the train pipe of the air brake system a speed governor controlled valve in one of said connections designed to open the same at a predetermined speed, at least one trip valve, a connection between said permissive valve and the inlet side of said trip valve, a trip lever for engaging the track obstacle to operate said trip valve, said permissive valve including an operating lever and quadrant, and means for locking said permissive valve lever against movement when said trip valve has been opened.

2. In a train stopping system, a gravity-drop controlled obstacle situated along the right of way and a train carried apparatus coöperative therewith; said train carried apparatus including the following elements in combination; to wit, a permissive valve, two connections between said permissive valve and the train pipe of the air brake system a speed governor controlled valve in one of said connections designed to open the same at a predetermined speed, at least one trip valve, a connection between said permissive valve and the inlet side of said trip valve, a trip lever for engaging the track obstacle to operate said trip valve, said permissive valve including an operating lever and quadrant, and means for locking said permissive valve lever against movement when said trip valve has been opened, and means for restraining said trip lever from accidental displacement.

3. In a train stopping system, a gravity-drop controlled obstacle situated along the right of way and a train carried apparatus coöperative therewith; said train carried apparatus including the following elements in combination; to wit, a permissive valve, two connections between said permissive valve and the train pipe of the air brake system a speed governor controlled valve in one of said connections designed to open the same at a predetermined speed, at least one trip valve, a connection between said permissive valve and the inlet side of said trip valve, a trip lever for engaging the track obstacle to operate said trip valve, said permissive valve including an operating lever and quadrant, and means for locking said permissive valve lever against movement when said trip valve has been opened, and means for restraining said trip lever from accidental displacement, said last named means comprising a spring pressed latch pin mounted to engage said trip lever when in its normal position, said trip lever having a recess to receive said latch pin.

WILLIAM AUSTIN.

Witnesses:
N. CURTIS LAMMOND,
P. F. DUFFY.